United States Patent
Fukui et al.

(10) Patent No.: US 7,542,244 B2
(45) Date of Patent: Jun. 2, 2009

(54) MAGNETIC HEAD TO PREVENT UNDESIRED DATA ERASURE AND MAGNETIC DISK STORAGE HAVING THE SAME

(75) Inventors: Hiroshi Fukui, Ibaraki (JP); Yoji Maruyama, Saitama (JP); Masafumi Mochizuki, Tokyo (JP); Tomohiro Okada, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 299 days.

(21) Appl. No.: 11/252,866

(22) Filed: Oct. 17, 2005

(65) Prior Publication Data

US 2006/0082930 A1    Apr. 20, 2006

(30) Foreign Application Priority Data

Oct. 15, 2004   (JP)   ............... 2004-301911

(51) Int. Cl.
*G11B 5/127*   (2006.01)
(52) U.S. Cl. .................................... 360/317
(58) Field of Classification Search ................ 360/317, 360/125.04, 125.43, 125.51, 126, 316; 29/603.14, 29/603.15
See application file for complete search history.

(56) References Cited

U.S. PATENT DOCUMENTS

| | | | |
|---|---|---|---|
| 4,656,546 A | | 4/1987 | Mallory |
| 5,894,388 A * | | 4/1999 | Sato et al. ............... 360/125.51 |
| 6,513,228 B1 * | | 2/2003 | Khizroev et al. ......... 29/603.14 |
| 6,650,503 B1 * | | 11/2003 | Chen et al. ............. 360/125.43 |
| 6,785,097 B2 | | 8/2004 | Okada et al. |
| 6,826,020 B2 * | | 11/2004 | Daby et al. ................. 360/317 |
| 6,914,756 B2 * | | 7/2005 | Molstad et al. ............. 360/316 |
| 7,140,095 B2 * | | 11/2006 | Matono .................... 29/603.15 |
| 7,145,750 B2 * | | 12/2006 | Kimura et al. ......... 360/125.04 |
| 7,221,544 B2 * | | 5/2007 | Ohtsu et al. ................. 360/317 |

(Continued)

FOREIGN PATENT DOCUMENTS

JP    02-201710 A    8/1990

(Continued)

OTHER PUBLICATIONS

European Search Report for European patent application EP05107117 (Jan. 11, 2008).

(Continued)

*Primary Examiner*—Tianjie Chen
(74) *Attorney, Agent, or Firm*—Townsend and Townsend and Crew LLP; Rambod Nader

(57) ABSTRACT

Embodiments of the invention provide a magnetic head (magnetic disk storage) which does not erase data on a recording medium even when a stray field is applied. In one embodiment, the head has a structure that $d1<t1$ and $d2<t2$ are satisfied where $d1$ denotes the positional difference between edges of an auxiliary pole and an upper shield in the cross-track direction, $d2$ denotes the positional difference between edges of the upper shield and a lower shield in the cross-track direction, $t1$ the film thickness of the auxiliary pole or upper shield, whichever magnetic layer is larger in cross-track width, and $t2$ the film thickness of the upper shield or lower shield, whichever magnetic layer is larger in cross-track width.

13 Claims, 14 Drawing Sheets

U.S. PATENT DOCUMENTS

| | | |
|---|---|---|
| 2003/0002211 A1 | 1/2003 | Tsuchiya et al. |
| 2003/0223149 A1 | 12/2003 | Kimura et al. |
| 2003/0227716 A1 | 12/2003 | Yamakura et al. |
| 2004/0004787 A1* | 1/2004 | Matono et al. ............... 360/126 |
| 2004/0150910 A1 | 8/2004 | Okada et al. |
| 2004/0150912 A1 | 8/2004 | Kawato et al. |

FOREIGN PATENT DOCUMENTS

| | | |
|---|---|---|
| JP | 2003-045008 A | 2/2003 |
| JP | 2004-185672 A | 7/2004 |

OTHER PUBLICATIONS

Japan Patent Office (JPO) office action dated Jul. 17, 2007 for JPO patent application JP2006-281621.

* cited by examiner

Fig. 10
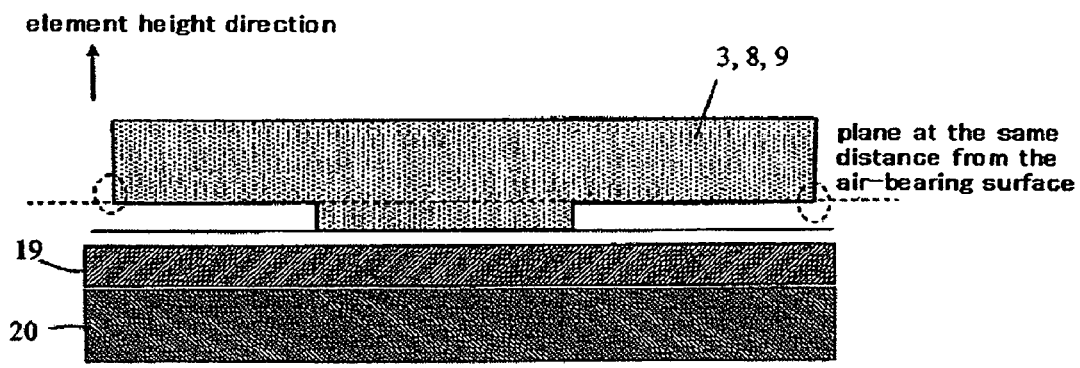
(a)
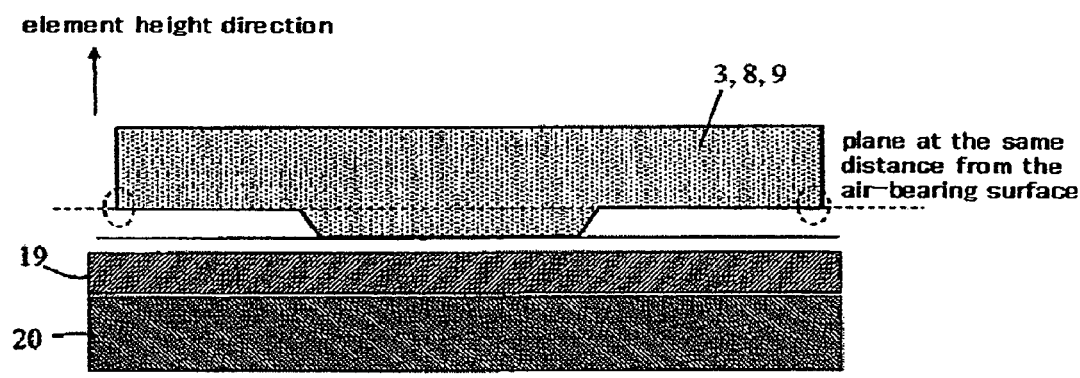
(b)

Fig. 1 3
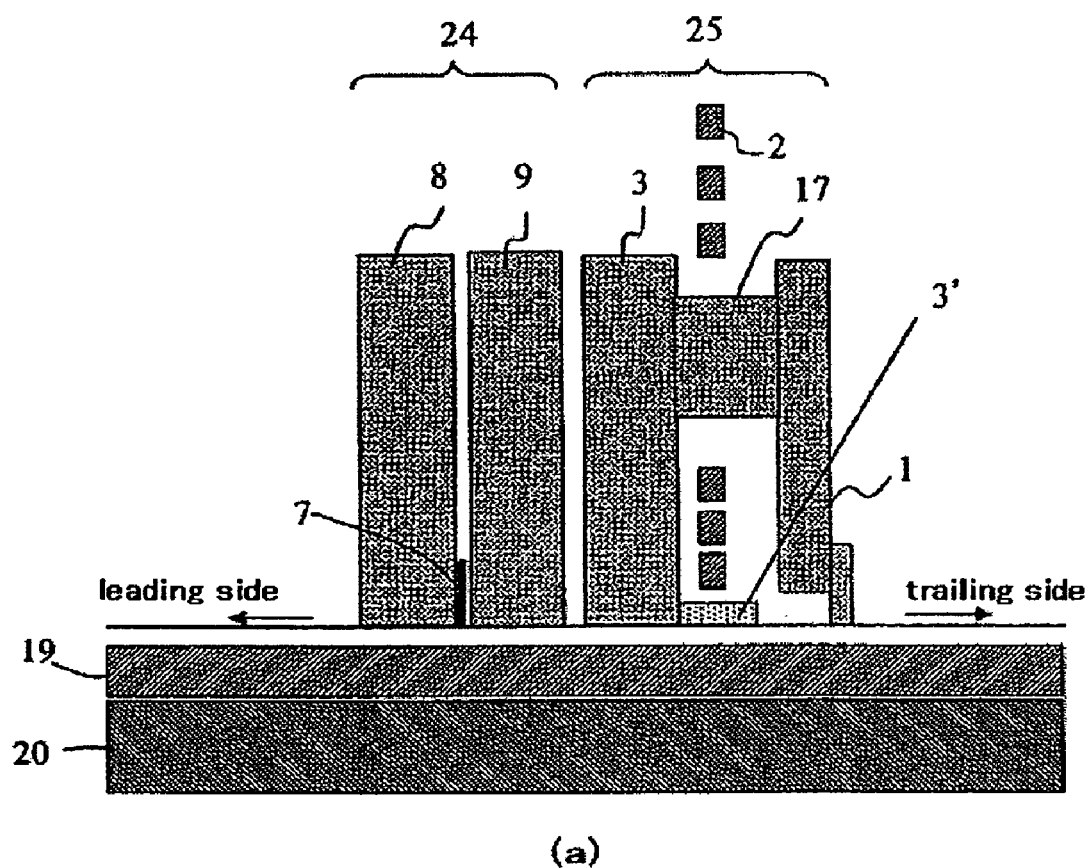
(a)
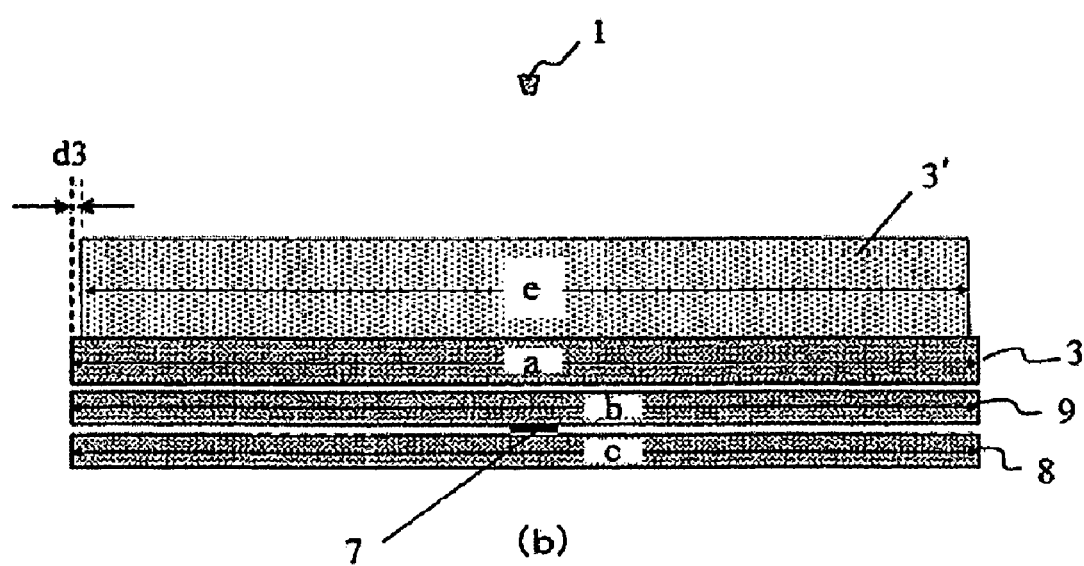
(b)

Fig. 14
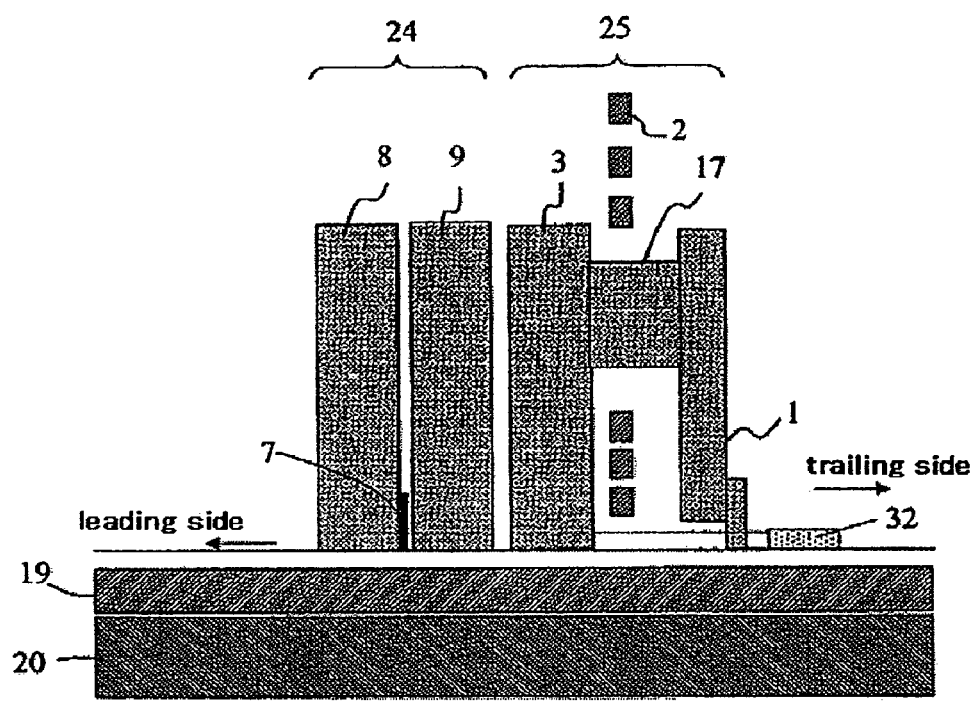
(a)
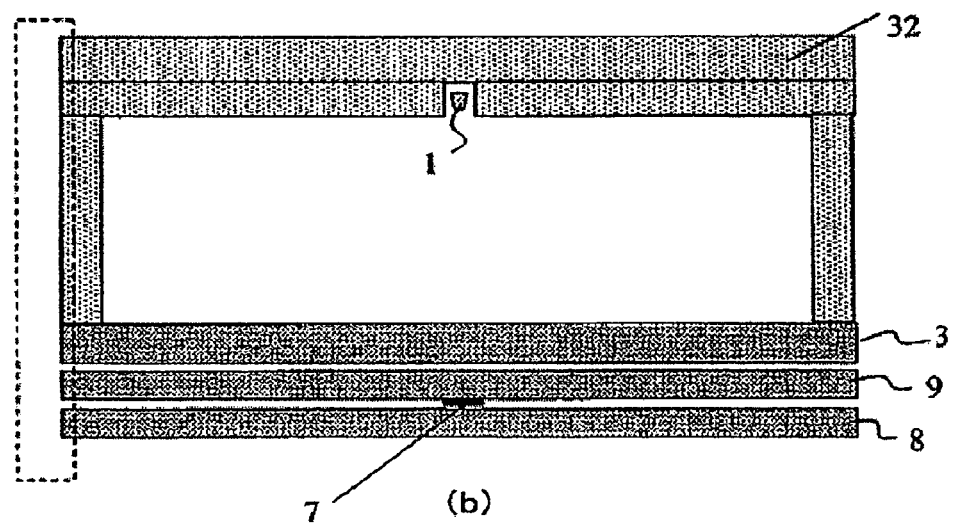
(b)

Fig. 15
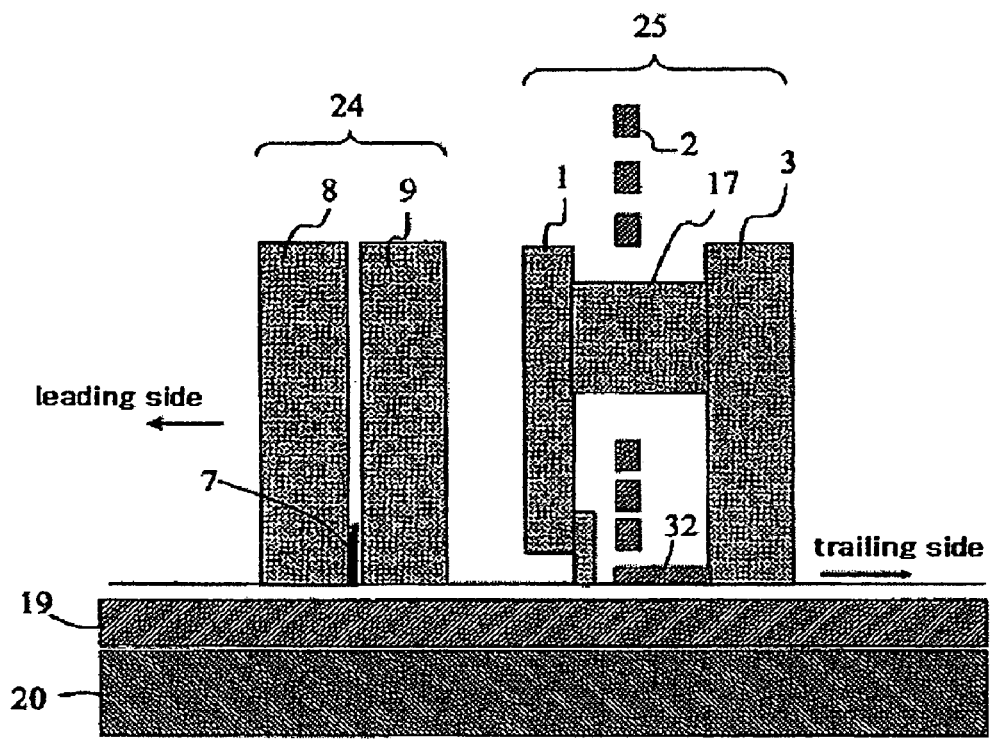
(a)
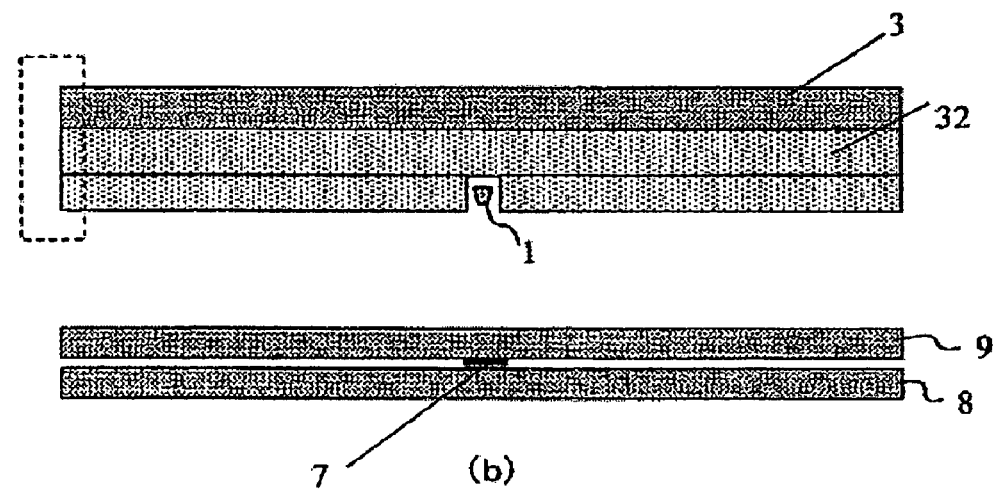
(b)

MAGNETIC HEAD TO PREVENT UNDESIRED DATA ERASURE AND MAGNETIC DISK STORAGE HAVING THE SAME

CROSS-REFERENCES TO RELATED APPLICATIONS

This application claims priority from Japanese Patent Application No. JP 2004-301911, filed Oct. 15, 2004, the entire disclosure of which is incorporated herein by reference.

BACKGROUND OF THE INVENTION

The present invention relates to a perpendicular recording magnetic head and a magnetic disk storage which incorporates the same.

In a magnetic disk storage, data on a recording medium is read or written by a magnetic head. In order to increase the magnetic disk's recording capacity per unit area, a higher areal density is needed. However, the current longitudinal recording method has a problem that as the write bit length decreases, it becomes difficult to increase the areal density due to thermal fluctuation in medium magnetization. A solution to this problem is a perpendicular recording method whereby magnetization signals are recorded in a direction perpendicular to the medium surface.

The perpendicular recording method is available in two types: one type uses a double-layered perpendicular medium having a soft under layer and the other type uses a single-layered perpendicular medium having no soft under layer. When a double-layered perpendicular medium is used as a recording medium, a stronger field can be applied to the medium by using a "single-pole head" which has a main pole and an auxiliary pole for recording.

FIG. 8 shows the relation between a perpendicular recording magnetic head 14 and a magnetic disk 11 and schematically illustrates how perpendicular recording takes place. A conventional magnetic head consists of a lower reader shield 8, a read element 7, an upper reader shield 9, an auxiliary pole 3, a thin film coil 2, and a main pole 1 which are laminated in the head traveling direction (from the leading side) in the order of mention. The lower reader shield 8, read element 7 and upper reader shield 9 constitute a read head 24 while the auxiliary pole 3, thin film coil 2 and main pole 1 constitute a write head (single-pole head) 25. Taking it into consideration that the head may have a skew angle, the air-bearing surface of the main pole is trapezoidal with its leading side width smaller than its trailing side one. A magnetic field from the main pole 1 of the write head 25 passes through a recording layer 19 and a soft under layer 20 of the magnetic disk 11 and enters the auxiliary pole 3 to make up a magnetic circuit so that a magnetization pattern is recorded on the recording layer 19. There may be an intermediate layer between the recording layer 19 and the soft under layer 20. The read element 7 of the read head 24 may be a giant magneto resistive element (GMR) or a tunneling magneto resistive element (TMR).

BRIEF SUMMARY OF THE INVENTION

Since the structure as shown in FIG. 8 has the auxiliary pole and the thin film coil between the read element and the main pole, the write-read element distance is large and the format efficiency is low. A structure as shown in FIG. 9 has been proposed to avoid this problem, where the auxiliary pole 3 is located on the trailing side of the main pole 1. This structure decreases the write-read element distance. Not only the write head field intensity but also field gradients which determine magnetic transition of write bits are important factors for achieving a high recording density. In order to achieve a higher recording density, the write field gradients must be increased. An approach to increasing the write field gradients is a structure in which a magnetic layer 32 is located on the trailing side of the main pole 1. Even in this structure, the auxiliary pole 3 may be located on the trailing side of the main pole 1 as shown in FIG. 9, in order to make up a closed magnetic flux path.

FIG. 4 is a plan view showing an example of a magnetic head structure. In the magnetic head shown in FIG. 4, the auxiliary pole 3, lower reader shield (hereinafter referred to simply as the lower shield) 8 and the upper reader shield (hereinafter referred to simply as the upper shield) 9 are different in cross-track width. No special attention is paid to the positional difference d between the edges of the auxiliary pole 3, lower shield 8 and upper shield 9 in the cross-track direction. The difference is considered to depend on the manufacturing process.

The present invention concerns a perpendicular recording system which uses a perpendicular recording head with a main pole and an auxiliary pole, and a double-layered perpendicular recording medium with an under layer. In this perpendicular recording system with an under layer, there may arise a phenomenon that data written on the medium is erased due to the influence of a stray (external) field. FIG. 5 is a graph which shows positions of data erasure on the disk when a stray field of $3.98 \times 10^3$ A/m is applied to the hard disk drive (HDD) through a coil. The stray field is applied in parallel to the disk surface. "0" in the horizontal axis represents the track center. The positions of data erasure are apart from each other by 30 μm, which corresponds to the width of the auxiliary pole and reader shields (upper shield and lower shield) used in this experiment.

FIG. 6 shows the field (calculated by three-dimensional field calculation) in the center of the magnetic recording layer facing the auxiliary pole when a stray field is applied in parallel to the medium surface. From this, it is known that the field is large at the edge of the auxiliary pole. In the head used in this experiment, the auxiliary pole, upper shield and lower shield are different in cross-track width on the air-bearing surface as shown in FIG. 4. d, the difference between edges of the auxiliary pole 3 and upper shield 9 in the cross-track direction, was larger than t, the film thickness of the upper shield 9 which is larger in cross-track width. In this calculation, the recording track width of the main pole 1 was 150 nm, and the film thickness of the main pole was 200 nm. The material for the main pole 1 was assumed to be CoNiFe. The auxiliary pole 3 was assumed to be made of a material with a saturation flux density of 1.0 T. It was 30 μm in cross-track width, 16 μm long in the element height direction and 2 μm in film thickness. The upper shield 9 and lower shield 8 were assumed to be made of a material of 80 at % Ni-20 at % Fe with a saturation flux density of 1.0 T. They were 30 μm in cross-track width, 16 μm long in the element height direction and 1.5 μm in film thickness. The material for the under layer 20 of the magnetic recording medium was assumed to be CoTaZr and the distance from the head air-bearing surface to the surface of the under layer 20 was 40 nm and the film thickness of the under layer 20 was 300 nm.

It is considered from the above that a stray field causes data erasure at the edges of the auxiliary pole and reader shields. When a stray field is applied in parallel to the medium surface, it must be taken into consideration that a magnetic flux absorbed in the under layer may flow into the auxiliary pole and reader shields. This problem must be solved in order to realize an HDD which uses a perpendicular recording method.

Therefore, the present invention has a feature to provide a magnetic head in which no data erasure occurs even when a stray field is applied in parallel to the medium surface of an HDD and thereby provide a high density magnetic disk storage.

According to an aspect of the present invention, a magnetic head comprises a write head having a main pole and an auxiliary pole, and a read head having a lower reader shield, an upper reader shield and a read element located between the lower reader shield and the upper reader shield, wherein b≧a is satisfied where a denotes the cross-track length of the auxiliary pole, b the cross-track width of the upper reader shield, and c the cross-track length of the lower reader shield. Furthermore, the positional difference between edges of two neighboring magnetic layers of plural soft layers stacked one upon another is smaller than the film thickness of whichever of the two magnetic layers is larger in cross-track width.

According to the present invention, the head structure has a function to weaken magnetic flux concentration on the edges of the auxiliary pole, lower shield and upper shield and reduce the leakage field from the edges of the auxiliary pole, lower shield and upper shield, and reduce the field applied to the magnetic recording layer. Here, the "head air-bearing surface" means a surface of a magnetic layer which faces the medium, where the magnetic layer is a component of the magnetic head except a protective film of non-magnetic material such as carbon.

According to the present invention, when a stray field is applied to the HDD, particularly in parallel to the medium of the HDD, leakage field from the auxiliary pole, lower shield and upper shield can be reduced and a write head which does not cause write bit degradation and erasure in the magnetic recording layer and an HDD incorporating the same can be provided.

BRIEF DESCRIPTION OF THE DRAWINGS

FIG. 10 is a plan view schematically showing another magnetic head according to the present invention.

FIG. 12 schematically shows the effect of variation in the point of maximum field intensity according to the present invention.

FIG. 13 schematically shows another example of a magnetic head according to the present invention.

FIG. 14 schematically shows another example of a magnetic head according to the present invention.

FIG. 15 schematically shows another example of a magnetic head according to the present invention.

DETAILED DESCRIPTION OF THE INVENTION

Figure 1:
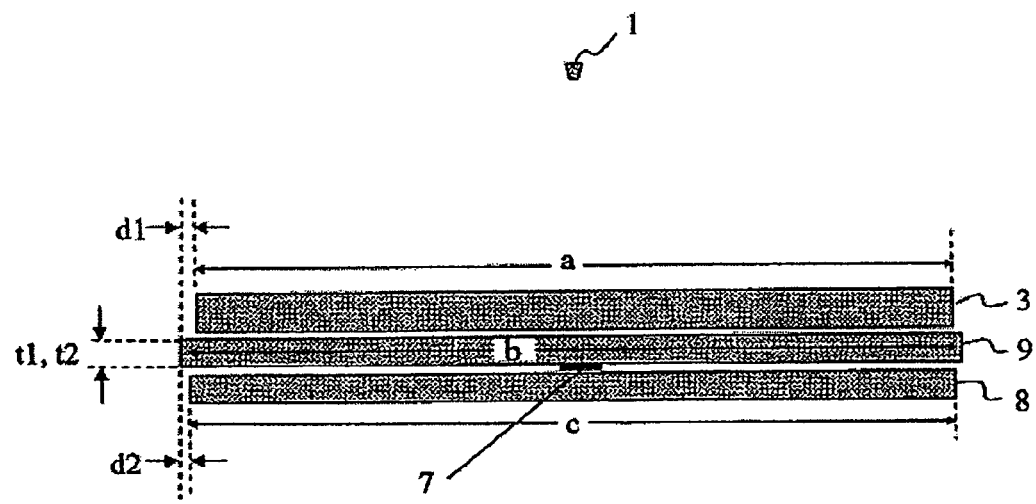
FIG. 1 is a plan view schematically showing a magnetic head as seen from a medium according to an embodiment of the present invention.

Next, specific embodiments of the present invention will be described referring to the accompanying drawings. To facilitate understanding, elements with like functions are designated by like reference numerals.

Figure 7:
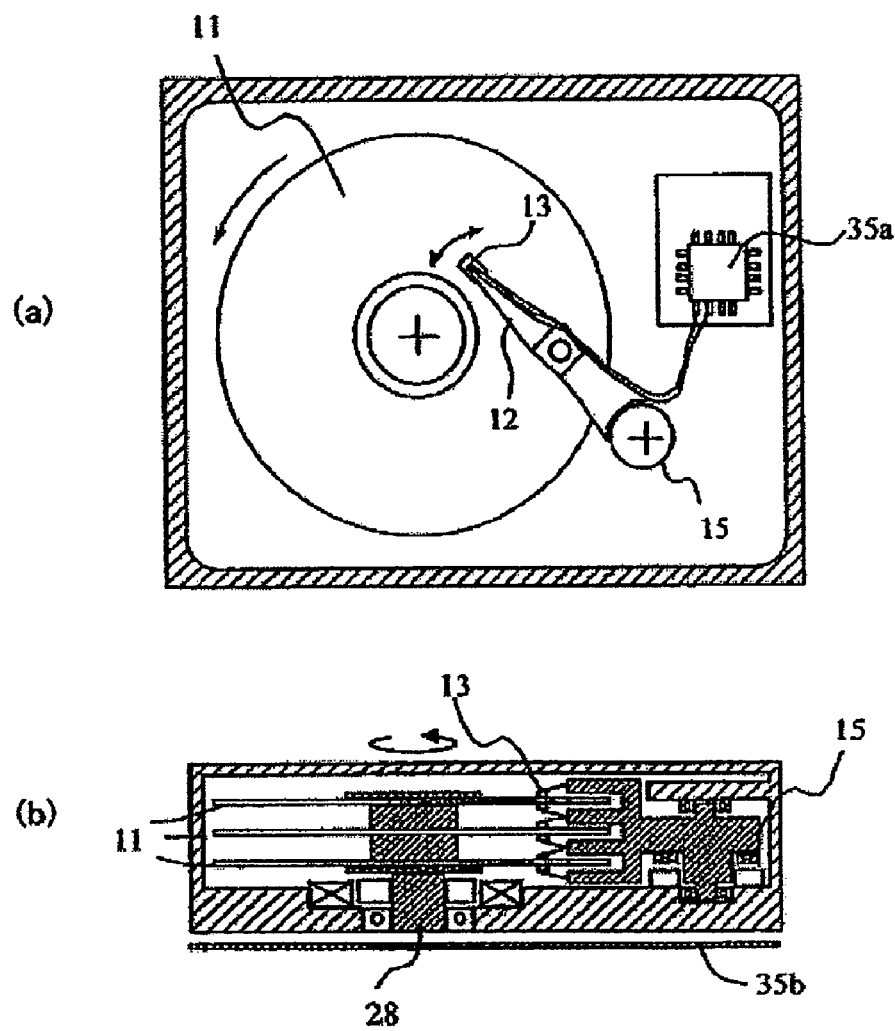
FIG. 7 schematically shows a magnetic disk storage.
Figure 8:
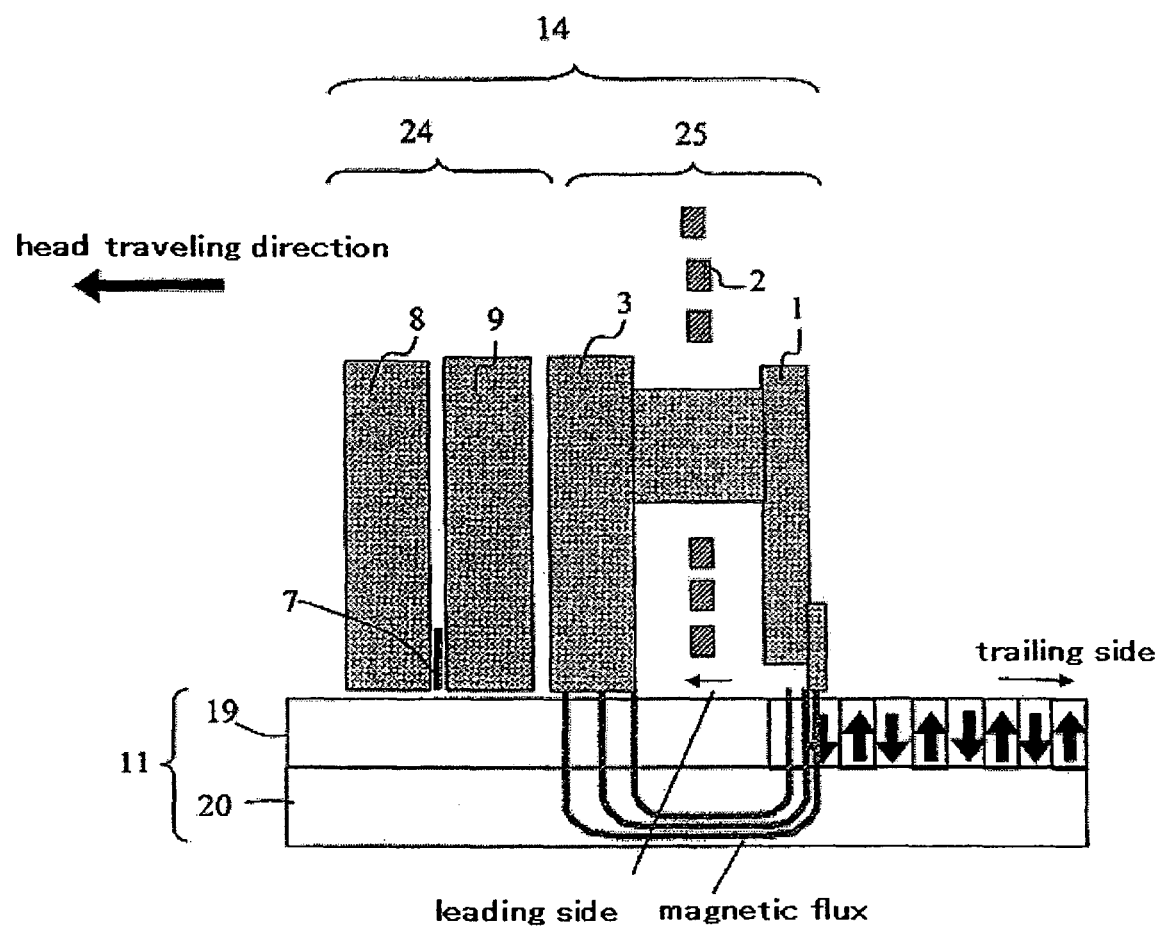
FIG. 8 schematically shows how perpendicular recording takes place in a conventional magnetic head for perpendicular recording.
Figure 9:
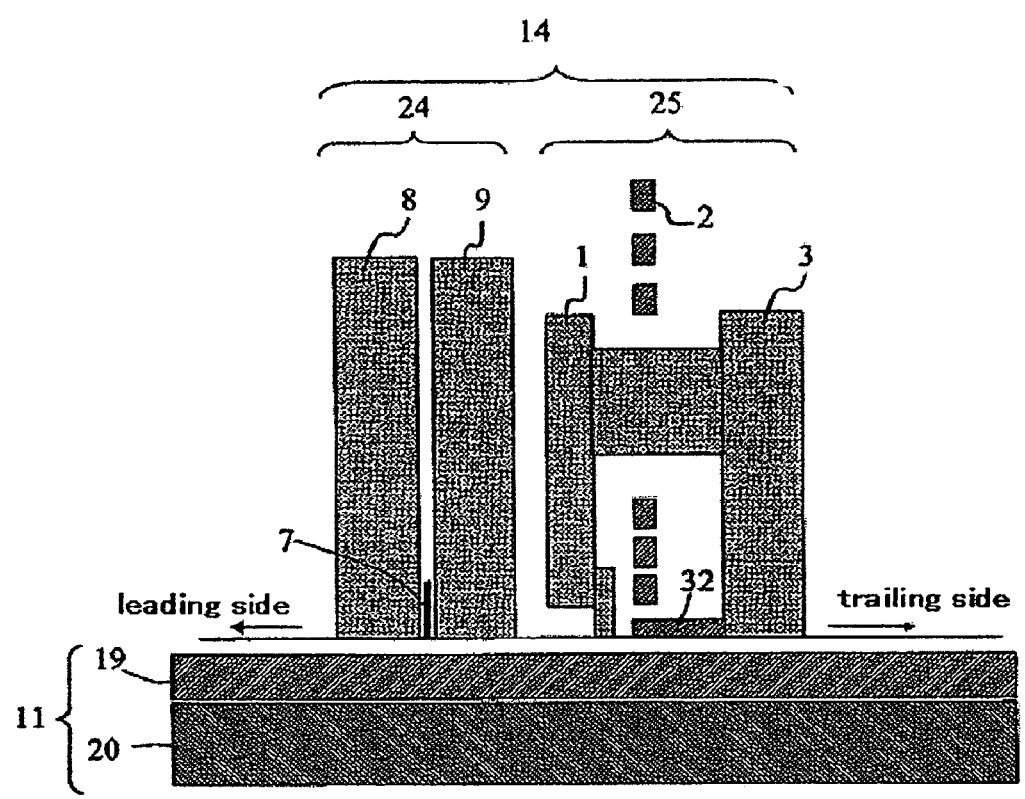
FIG. 9 shows the structure of another magnetic head for perpendicular recording.

FIG. 7 is a conceptual diagram showing a magnetic disk storage according to an embodiment of the present invention. In this magnetic disk storage, a magnetic head mounted on a slider 13 fixed to the tip of a suspension arm 12 writes and reads magnetization signals at a given position on a magnetic disk (magnetic recording medium) 11 which is rotated by a motor 28. A rotary actuator 15 is driven to select a magnetic head position (track) in the magnetic disk radial direction. A write signal to the magnetic head and a read signal from it are processed by signal processing circuits 35*a* and 35*b*.

Figure 2:
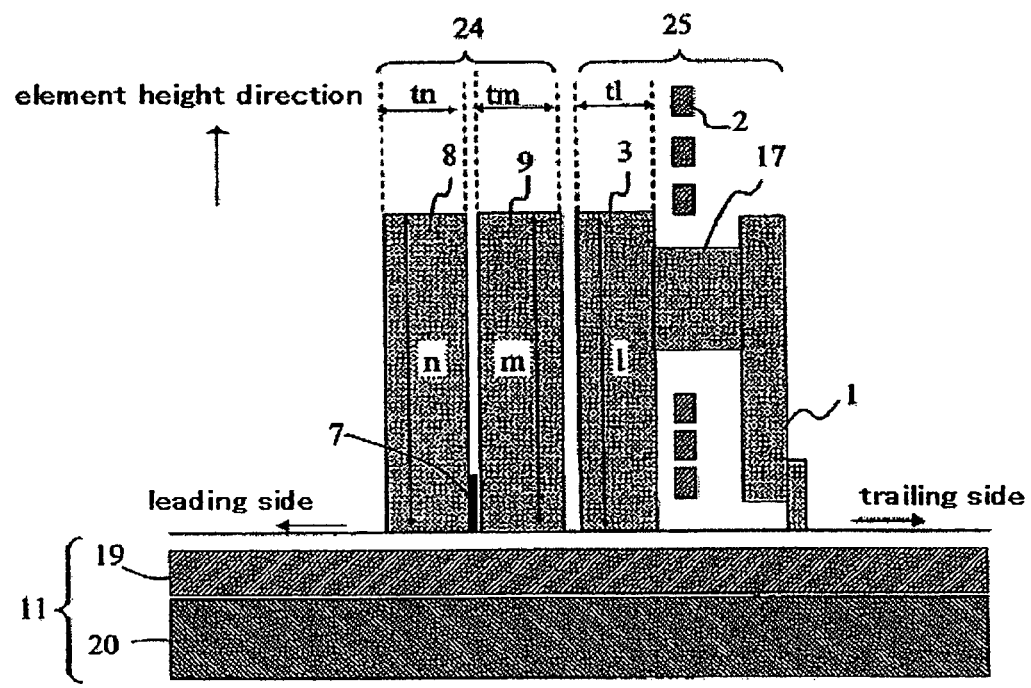
FIG. 2 is a sectional view schematically showing a magnetic head according to the present embodiment.

FIG. 1 is a plan view which schematically shows a head air-bearing surface in a magnetic head according to an embodiment of the present invention. FIG. 2 schematically shows a section of the magnetic head shown in FIG. 1.

This magnetic head is a write/read combination head which has a write head 25 with a main pole 1 and an auxiliary pole 3 and a read head 24 with a read element 7. The main pole 1 and the auxiliary pole 3 are magnetically connected in a position away from the air-bearing surface through a pillar 17, and a thin film coil 2 is interlinked with a magnetic circuit which is composed of the main pole 1, auxiliary pole 3 and pillar 17. The read element 7, which is a giant magneto resistive element (GMR) or a tunneling magneto resistive element (TMR), is located between a pair of magnetic shields (reader shields): a lower shield 8 (leading side) and an upper shield 9 (trailing side). The main pole 1 is located on the tracking side of the auxiliary pole 3. On the head air-bearing surface, the components are arranged so that the relations of d1≦t1 and d2≦t2 are satisfied where d1 denotes the positional difference between the edges of the auxiliary pole 3 and upper shield 9 in the cross-track direction, d2 the positional difference between the edges of the upper shield 9 and lower shield 8 in the cross-track direction, t1 the film thickness of the auxiliary pole 3 or upper shield 9, whichever magnetic layer is larger in cross-track width, and t2 the film thickness of the upper shield 9 or lower shield 8, whichever magnetic layer is larger in cross-track width. Also, the magnetic disk storage has a recording medium 11 including an under layer 20 on a board and a recording layer 19 laid over it. In the example shown in FIG. 1, the upper shield 9 is longer in the cross-track width than the auxiliary pole 3 and lower shield 8 and therefore t1 and t2 both correspond to the film thickness of the upper shield 9.

Figure 4:
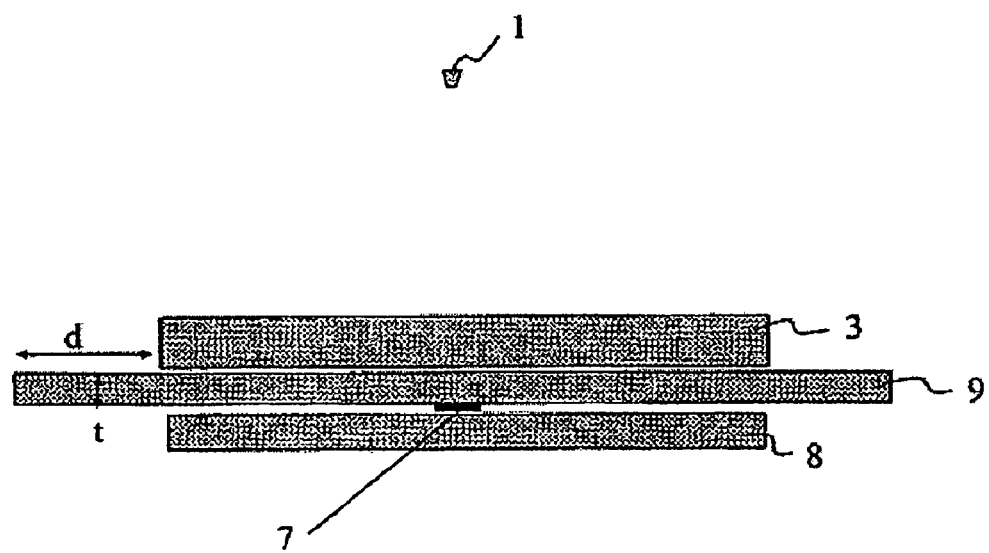
FIG. 4 shows the structure of a magnetic head.
Figure 5:
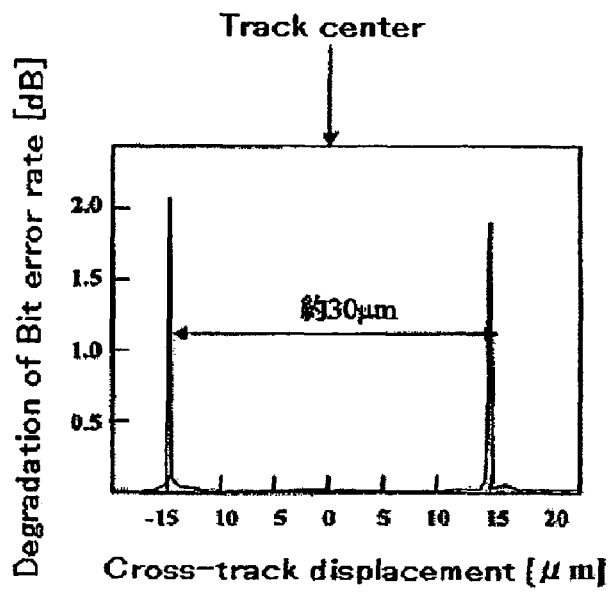
FIG. 5 shows the relation between cross-track displacement and reduction in output.
Figure 6:
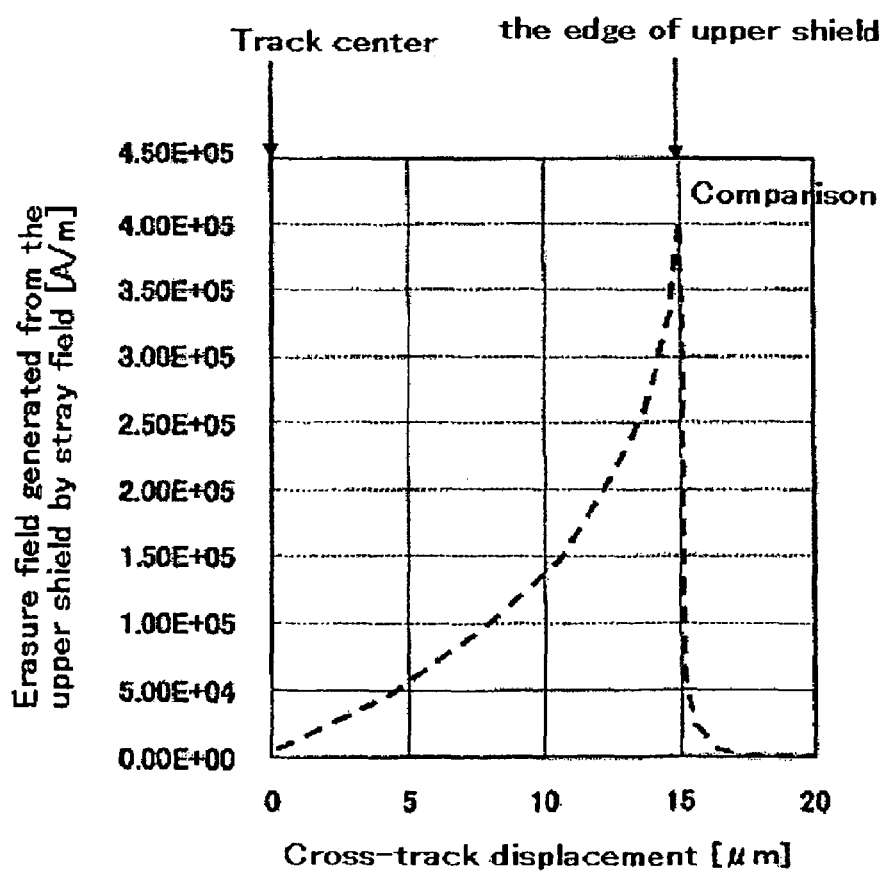
FIG. 6 shows field generated from the upper shield by a stray field applied to a conventional head.

As shown in FIG. 4, in the conventional head structure in which the positional difference between edges of magnetic layers is large, when a stray field is applied to the HDD, there is a problem that a field might leak from the auxiliary pole 3, lower shield 8 and upper shield 9 and data on the magnetic recording layer 19 might be erased. This problem is characteristic of a double-layered perpendicular recording system which uses a recording medium consisting of an under layer and a recording layer laid over it on a board. The present invention has a feature to reduce the field generated from the edges of the auxiliary pole 3, lower shield 8 and upper shield 9. When the structure as shown in FIGS. 1 and 2 is employed, the field which leaks from the auxiliary pole 3 decreases, thereby preventing erasure of data written on the magnetic recording layer 19.

For the conventional magnetic head shown in FIG. 4, the field applied to the magnetic recording layer 19 from the edges of the auxiliary pole, upper shield and lower shield was calculated by three-dimensional field calculation. In this calculation, the recording track width of the main pole 1 was 150 nm, and the film thickness of the main pole was 200 nm. The material for the main pole 1 was assumed to be CoNiFe. The auxiliary pole 3 was assumed to be made of a material with a saturation flux density of 1.0 T. It was 30 μm in cross-track width, 16 μm long in the element height direction and 2 μm in film thickness. The upper shield 9 and lower shield 8 were assumed to be made of a material of 80 at % Ni-20 at % Fe with a saturation flux density of 1.0 T. They were 30 μm in cross-track width, 16 μm long in the element height direction and 1.5 μm in film thickness. The material for the under layer 20 of the magnetic recording medium was assumed to be CoTaZr and the distance from the head air-bearing surface to the surface of the under layer 20 was 40 nm and the film thickness of the under layer 20 was 300 nm. The length d as shown in FIG. 4 was 3 μm. The applied stray field was $3.98 \times 10^3$ A/m. According to the three-dimensional field calculation, for the conventional magnetic head as shown in FIG. 4, the maximum intensity of the field applied to the magnetic recording layer 19 was $4.06 \times 10^5$ A/m at the edge of the upper shield (widest). If a large field like this should be applied to the recording layer position, degradation or erasure of write bits might occur.

Similarly, for the magnetic head in the present embodiment as shown in FIG. 1, the field applied to the magnetic recording layer 19 from the edges of the auxiliary pole, upper shield and lower shield was calculated by three-dimensional field calculation. The calculation was made under the same condition as above except that the cross-track length of the auxiliary pole 3, a, that of the upper shield, b, and that of the lower shield, c, are all 30 μm and d1=d2=0. The maximum intensity of the field applied to the magnetic recording layer 19 was $3.08 \times 10^5$ A/m at the edge of the auxiliary pole 3.

Figure 3:
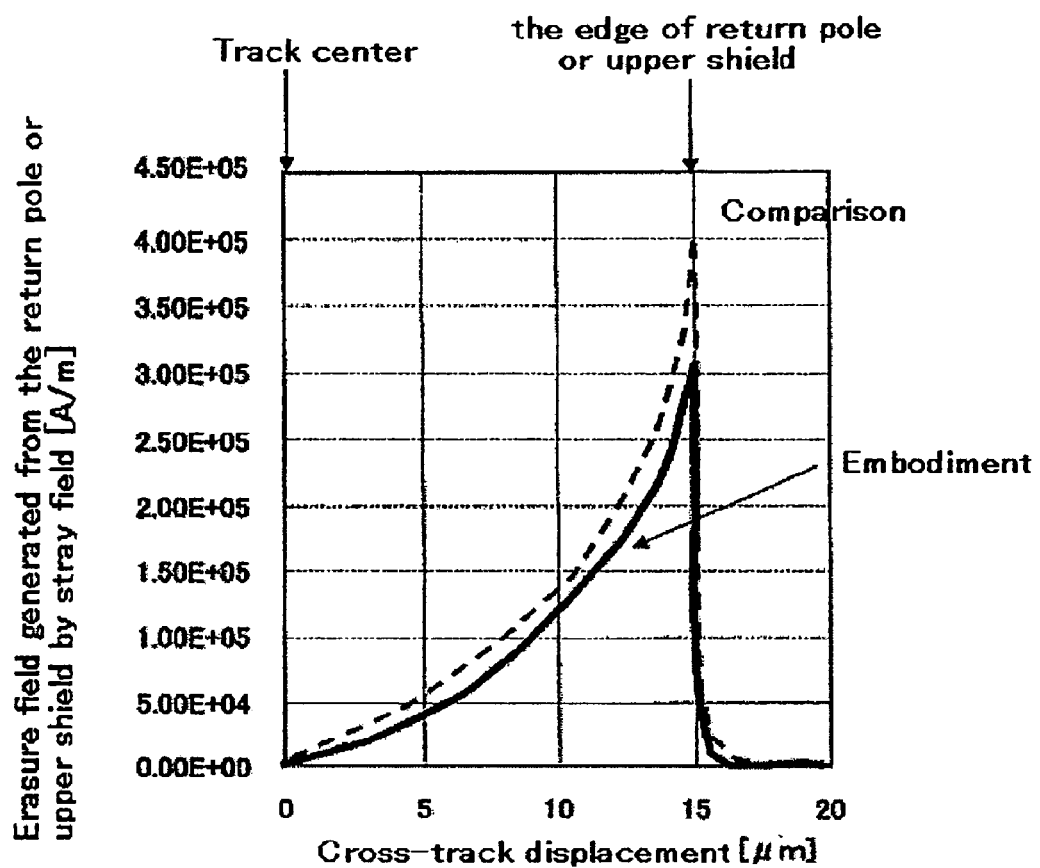
FIG. 3 shows distribution of field from the magnetic head in the cross-track direction.

FIG. 3 shows a magnetic field profile in the cross-track direction. The origin of the horizontal axis is the track center. The graph shows that the field decreases in the structure according to the present embodiment. Actually, when a magnetic head according to the present embodiment was manufactured by a manufacturing method described later and used, erasure of data on the recording layer was reduced. This is because the magnetic layers are almost equal in width and no magnetic flux concentration on a wider magnetic layer occurs.

FIG. 10 shows another example of a magnetic head according to the present invention. It is a plan view showing the auxiliary pole 3, upper shield 9 and lower shield 8 as seen from the trailing side of the magnetic head. The width as defined by the present invention is the width on the head air-bearing surface and a magnetic layer level difference or slant in the element height direction as shown in FIG. 10 is acceptable. Regarding points of the auxiliary pole 3, upper shield 9 and lower shield 8 as recessed from the head air-bearing surface, it is desirable that the edges (encircled by dotted line) in the cross-track direction be on the same plane at the same distance from the head air-bearing surface (indicated by solid line) in the cross-track direction.

If the auxiliary pole 3, upper shield 9 and lower shield 8 should be long in the element height direction and a stray field is applied to the magnetic disk perpendicularly, leakage field from the auxiliary pole 3, upper shield 9 and lower shield 8 would increase. Therefore, it is desirable that their length in the element height direction be smaller than their cross-track length. The reason is as follows. If the auxiliary pole 3, upper shield 9 and lower shield 8 are long in the element height direction, the demagnetization factor is small. On the other hand, when their cross-track length is larger than that in the element height direction, the demagnetization factor is larger. For this reason, a head according to a feature of the present invention is applied to this structure. In an embodiment of the invention, while the cross-track width (length in the cross-track direction) is 30 μm, the length in the element height direction is 16 μm.

Figure 11:
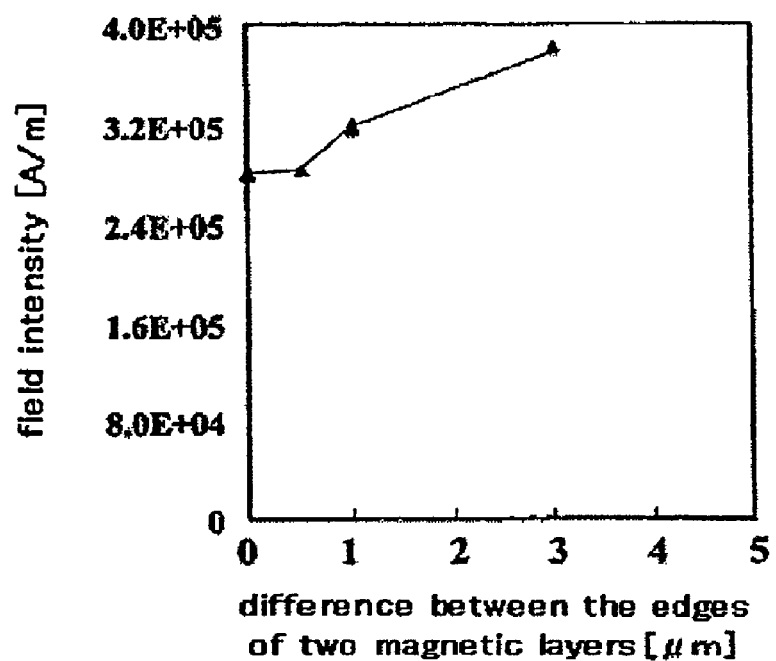
FIG. 11 shows the relation between the difference between the edges of magnetic layers and the field intensity when a stray field is applied to a magnetic head according to the present invention.
Figure 1:
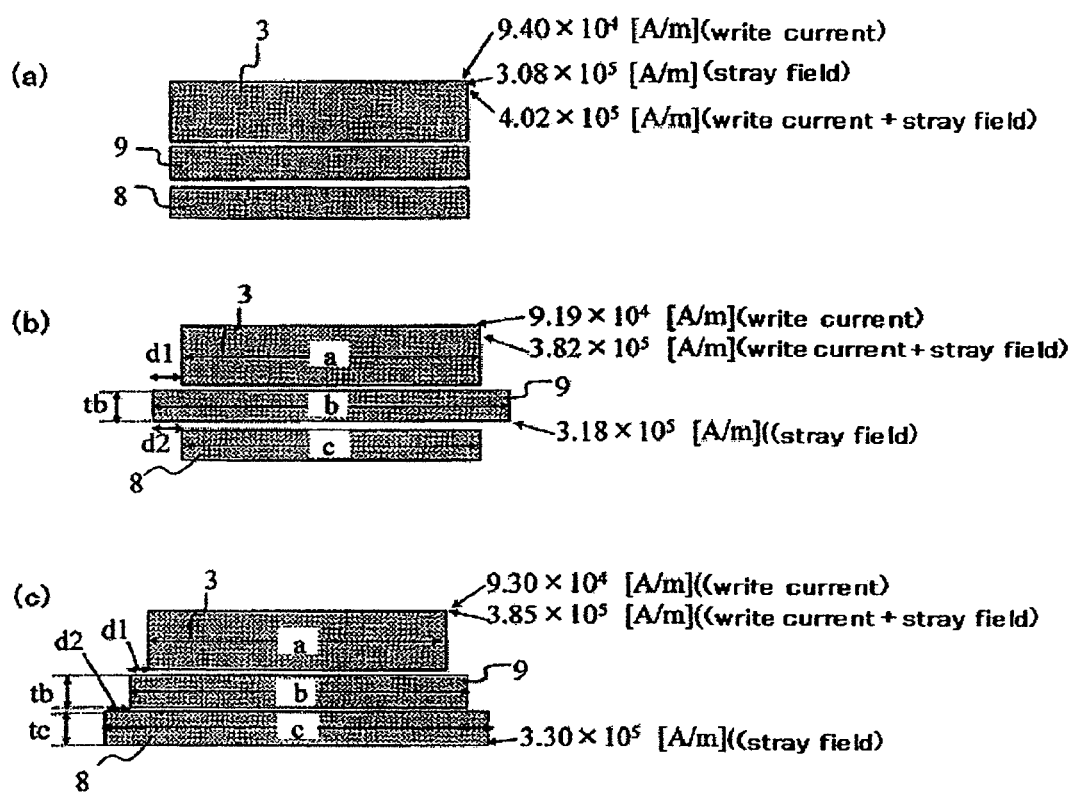

In order to obtain the effect of the present invention, it is important to prevent magnetic flux concentration by eliminating or decreasing the width difference among the auxiliary pole 3, upper shield 9 and lower shield 8. FIG. 11 is a graph which shows the relation between dw as the positional difference between the edges of two neighboring magnetic layers in the cross-track direction and the maximum intensity of leakage field from the edge of a protruding magnetic layer in the cross-track direction. The magnetic layer width was 30 μm and the thickness was 1 μm. The magnetic layers were assumed to be made of a material of 80 at % Ni-20 at % Fe with a saturation flux density of 1.0 T and a relative permeability of 1500.

From FIG. 11, it is known that leakage field from the magnetic layer edges can be reduced by decreasing the positional difference between the edges in the cross-track direction. Particularly, it is desirable that dw be smaller than film thickness t. In the example shown, it is effective to make it below 1 μm (film thickness t). This is because of the effect that the edge protruding part is longer than it is wide in the cross-track direction. It has been found that when dw≦t, increase in the field intensity is reduced to about 10% of the field intensity at dw=0.

In order to solve the problem of data erasure, it is desirable to take into consideration the influence of a leakage field caused by write current. Some write current concentrates on the auxiliary pole edge close to the coil. When the auxiliary pole 3, upper shield 9 and lower shield 8 are equal in width, the point where a leakage field caused by write current is maximum coincides with the point where a leakage field caused by a stray field is maximum, so that the field intensity increases. Hence, it has been found that it is desirable to make the width of the upper shield slightly larger than the width of the auxiliary pole 3 so that the point where a leakage field caused by write current is maximum does not coincide with the point where a leakage field caused by a stray field is maximum. When the positional difference between the edges of the magnetic layers in the cross-track direction is smaller than the film thickness of the larger magnetic layer in cross-track length, the sum of a leakage field caused by write current and a leakage field caused by a stray field is smaller than when the magnetic layers are equal in width and data erasure is thus suppressed.

The result of three-dimensional field calculation is shown in FIG. 12. In this calculation, the recording track width of the main pole 1 was 150 nm and its film thickness was 200 nm. The material for the main pole was assumed to be CoNiFe. The auxiliary pole 3 was assumed to be made of a material with a saturation flux density of 1.0 T. It was 30 μm in cross-track width, 16 μm long in the element height direction and 2 μm in film thickness. The upper shield 9 and lower shield 8 were assumed to be made of a material of 80 at % Ni-20 at % Fe with a saturation flux density of 1.0 T. They were 30 μm in cross-track width, 16 μm long in the element height direction and 1.5 μm in film thickness. The material for the under layer 20 of the magnetic recording medium was assumed to be CoTaZr and the distance from the head air-bearing surface to the surface of the under layer 20 was 40 nm and the film thickness of the under layer 20 was 300 nm. The applied external field was 500 e.

FIG. 12(*a*) shows an example where the auxiliary pole 3, upper shield 9 and lower shield 8 have all a width of 30 μm and their edges are in alignment. When there was no positional difference between the magnetic layer edges in the cross-track direction, the maximum intensity of field caused by a stray field was $3.08 \times 10^5$ A/m at the edge of the auxiliary pole 3 while the maximum intensity of field caused by write current was $9.04 \times 10^4$ A/m at the edge of the auxiliary pole 3. The sum was $4.02 \times 10^5$ A/m.

FIG. 12(*b*) shows the result of calculation where the width of the auxiliary pole 3 is 30 μm, that of the upper shield 9 is 32 μm and that of the lower shield 8 is 30 μm, and the film thickness of the upper shield tb is 1.5 μm, and d1 (positional difference between the edges of the auxiliary pole 3 and upper shield 9 in the cross-track direction) and d2 (positional difference between the edges of the lower shield 8 and upper shield 9 in the cross-track direction) are both 1 μm.

When d1, the positional difference between the edges of the auxiliary pole 3 and upper shield 9 in the cross-track direction, was smaller than tb, the film thickness of the upper shield (the larger in cross-track length) and d2, the positional difference between the edges of the upper shield 9 and lower shield 8 in the cross-track direction, was smaller than tb, the film thickness of the upper shield (the larger in cross-track length), the maximum intensity of field caused by a stray field was $3.18 \times 10^5$ A/m at the edge of the upper shield, which is larger than when there is no positional difference between the edges. The maximum intensity of field caused by write current was $9.19 \times 10^4$ A/m at the edge of the auxiliary pole 3. The sum of the fields caused by a stray field and write current was $3.82 \times 10^5$ A/m, which is smaller than in the case of FIG. 12(*a*). Hence, according to the present invention, it is more desirable that the relations of b>a and b>c be both satisfied where a denotes the cross-track length of the auxiliary pole, b that of the upper shield, and c that of the lower shield.

FIG. 12(*c*) shows the result of calculation where the cross-track length of the lower shield 8 is the largest. The calculation was made under the following condition: the width of the auxiliary pole 3 was 30 μm, that of the upper shield 31 μm, and that of the lower shield 32 μm, and d1<tb and d2 was smaller than the film thickness of the lower shield tc. Even under this condition, the sum of fields caused by a stray field and write current was $3.85 \times 10^5$ A/m, which is smaller than in the case of FIG. 12(*a*). Hence, when c>b, magnetic flux concentration caused by a stray field at the edge of the lower shield is also allowable, and from the result shown in FIG. 11, it is desirable that the positional difference between the edges in the cross-track direction be not more than about 1 μm.

Furthermore, according to embodiments of the present invention, taking it into consideration a situation that a stray field is applied perpendicularly to the magnetic disk, it is desirable that the auxiliary pole 3, upper shield 9 and lower shield 8 be equal in height, as shown in FIG. 2. Also it is desirable that the main pole be equal in height. This arrangement prevents magnetic flux concentration on a single magnetic layer. It is desirable that the absolute values |l−m|≦t1 or |l−m|≦tm and |m−n1|≦tm be satisfied, where l, m and n respectively denote the lengths of the auxiliary pole, upper shield and lower shield in the element height direction, and t1, tm and tn respectively denote the film thicknesses of the auxiliary pole, upper shield and lower shield.

In addition, according to the embodiments of present invention, in order to reduce the field from the auxiliary pole as caused by write current, even when the film thickness of the auxiliary pole on the air-bearing surface is increased, it is desirable to reduce the width difference of the additional magnetic layer 3'. FIG. 13(*a*) is a sectional view of a magnetic head according to an embodiment of the present invention where the film thickness of the auxiliary pole on the air-bearing surface is increased; FIG. 13(*b*) is a plan view of the air-bearing surface. For the same reason as above, it is desirable that the absolute value of d3, the positional difference between the edge of the magnetic layer 3' as a part of the auxiliary pole 3 and the edge of the auxiliary pole 3 itself be smaller than the film thickness of the auxiliary pole 3.

It is desirable that the principle of the present invention be similarly applied to other magnetic layers used in the head such as a magnetic layer 32 for increasing field gradients. FIG. 14(*a*) is a sectional view of another magnetic head according to the present invention and FIG. 14(*b*) is a plan view of the air-bearing surface. The magnetic layer (trailing side shield) 32 for increasing field gradients is located on the trailing side of the main pole 1. The magnetic layer 32 is connected to the auxiliary pole. In order to prevent magnetic flux concentration on the edge of the magnetic layer, it is desirable that the positional difference between the edges of the magnetic layer 32 and the auxiliary pole 3 in the cross-track direction be small, preferably smaller than the film thickness of the auxiliary pole or about 1 μm. It is desirable that displacement (in the cross-track direction) of a junction of another magnetic layer as indicated by dotted line in the figure be not more than about 1 μm.

FIG. 15 schematically shows a magnetic head with the main pole located on the leading side of the auxiliary pole 3, according to another embodiment of the present invention. FIG. 15(*a*) is a sectional view and FIG. 15(*b*) is a plan view of the air-bearing surface. Again in this structure, it is desirable that the positional difference between the edges of the magnetic layer 32 for increasing field gradients and the auxiliary pole 3 in the cross-track direction be small, preferably smaller than the film thickness of the auxiliary pole or about 1 μm. In order to increase field gradients, 45 at % Ni-55 at % Fe, 80 at % Ni-20 at % Fe or the like is used as the material for the magnetic layer 32.

Next, a method of manufacturing a magnetic head according to embodiments of the present invention will be described. Conventionally, while a planarization step for the lower shield has been taken for higher accuracy in the track width of the read head, no planarization step has been taken for the upper shield.

Figure 16:
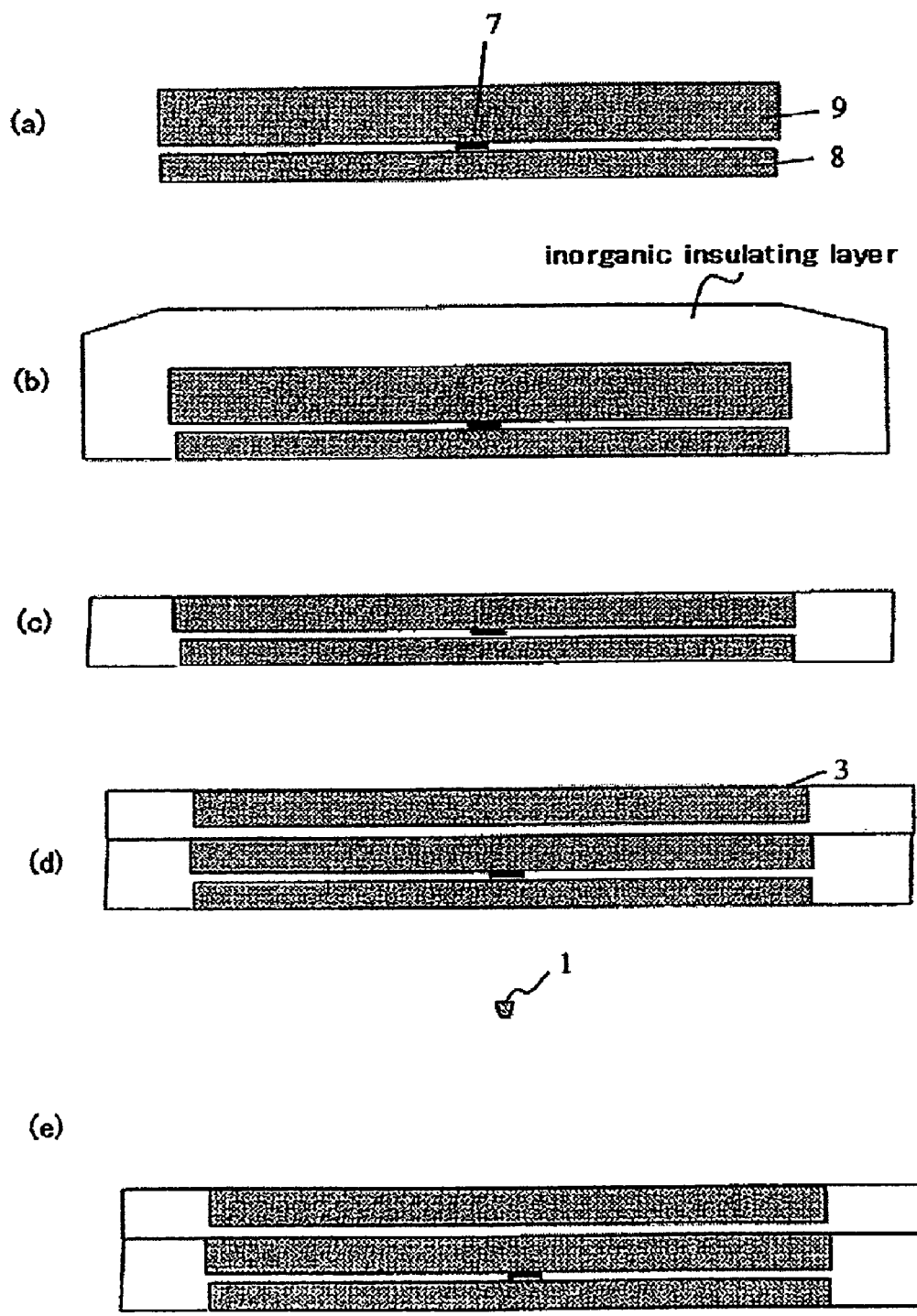
FIG. 16 shows a process of manufacturing a magnetic head according to the present invention.

FIG. 16 shows an example of an upper shield manufacturing method according to an embodiment of the present invention. FIG. 16(*a*) shows the formation of a magnetic film for the upper shield 9. The film thickness of the magnetic layer for the upper shield at this time should be thicker than the finished thickness because it decreases in later steps. The extra thickness should be 0.5-1 μm. FIG. 16(*b*) shows the formation of an inorganic insulating layer for the upper shield. The inorganic insulating layer may be a single layer of $Al_2O_3$, $SiO_2$, $Ta_2O_5$, $TiO_2$ or the like or a combination of two or more of these materials. FIG. 16(*c*) shows a finished upper shield as a result of planarizing the inorganic insulating layer and the magnetic layer for the upper shield. As the planarization technique, chemical mechanical polishing (CMP) may be used. When the upper shield is planarized in this way, the accuracy of an auxiliary pole formed over it can be high and the positional difference d1 between the edges of the auxiliary pole and upper shield in the cross-track direction can be small (below t1). The positional difference between the edges of the upper shield and lower shield can be sufficiently small (below t1) because the planarization step is taken as mentioned above. After that, an inorganic insulating layer is formed and then an auxiliary pole 3 is formed and a coil is formed, as shown in FIG. 16(d). Then, a main pole 1 is formed as shown in FIG. 16(e) and consequently a magnetic head according to an embodiment of the present invention is obtained.

Figure 17:
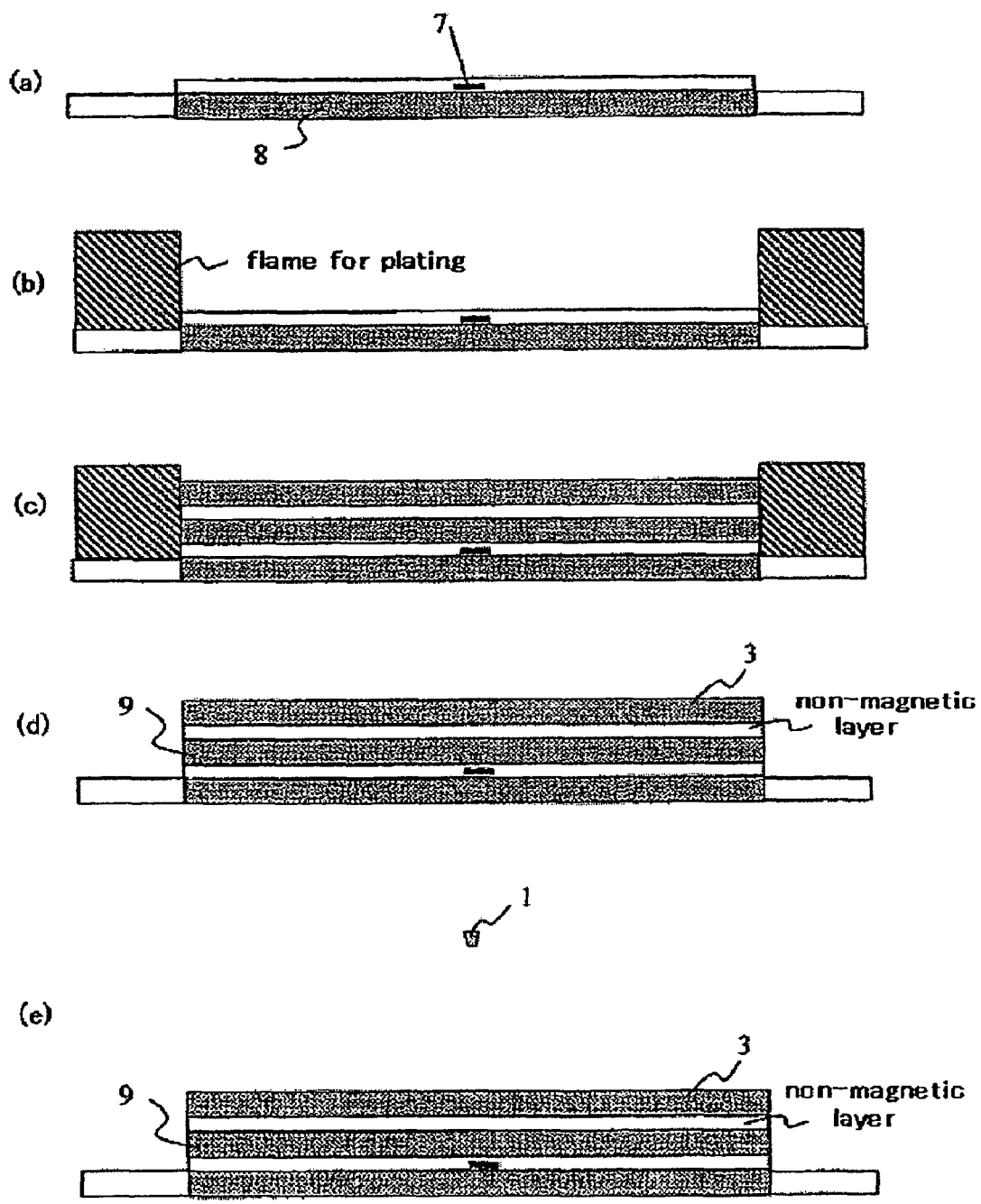
FIG. 17 shows another process of manufacturing a magnetic head according to the present invention.

FIG. 17 shows another example of a method of making an upper shield and an auxiliary pole. FIG. 17(a) shows the formation of a lower shield 8, a read element 7 and a reader gap layer. FIG. 17(b) shows the formation of a resist frame for plating after the formation of an undercoat for plating (not shown). FIG. 17(c) shows that after the magnetic layer for the upper shield 9 is plated, the non-magnetic layer is plated, then the magnetic layer for the auxiliary pole 3 is plated. The upper shield may be made of 45 at % Ni-55 at % Fe, 80 at % Ni-20 at % Fe or the like; the non-magnetic layer may be made of NiP, NiPd, Pd, Ru, Au, Cu or the like. The auxiliary pole may be made of 45 at % Ni-55 at % Fe, 80 at % Ni-20 at % Fe or the like. FIG. 17(d) shows that the resist frame and the undercoat for plating are removed and an upper shield, a non-magnetic layer, and an auxiliary pole are formed. According to this method, since the upper shield 9 and auxiliary pole 3 are made at the same time, the process is shortened and displacement between the edge of the upper shield 9 and the edge of the auxiliary pole 3 on the air-bearing surface due to pattern misalignment and pattern width variation can be minimized and obviously is below t1. Then, a main pole 1 is formed after the formation of a coil, etc, as shown in FIG. 17(e) and consequently a magnetic head according to an embodiment of the present invention is obtained.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic head comprising:
   a write head having a main pole and an auxiliary pole; and
   a read head having a lower reader shield, an upper reader shield, and a read element located between said lower reader shield and said upper reader shield;
   wherein b>a and b≧c are satisfied where, on an air-bearing surface, a denotes a cross-track width of said auxiliary pole, b denotes a cross-track width of said upper reader shield, and c denotes a cross-track width of said lower reader shield,
   wherein d1≦t1 and d2≦t2 are satisfied where d1 denotes a positional difference between edges of said auxiliary pole and upper reader shield on the air-bearing surface in the cross-track direction, d2 denotes a positional difference between edges of said upper reader shield and lower reader shield on the air-bearing surface in the cross-track direction, t1 denotes the film thickness of said auxiliary pole or upper reader shield, whichever of magnetic layers constituting said auxiliary pole and said upper reader is larger in cross-track width, and t2 denotes the film thickness of said upper reader shield or lower reader shield, whichever is larger in cross-track width.

2. The magnetic head as claimed in claim 1, wherein b>c is satisfied.

3. The magnetic head as claimed in claim 1, wherein regarding a magnetic layer constituting said auxiliary pole, a magnetic layer constituting said lower reader shield, and a magnetic layer constituting said upper reader shield, a positional difference between edges of two neighboring magnetic layers thereof is smaller than the film thickness of whichever of the two neighboring magnetic layers is larger in cross-track width.

4. The magnetic head as claimed in claim 3, wherein d1 and d2 are not more than about 1μm.

5. The magnetic head as claimed in claim 3, wherein a magnetic layer magnetically connected with said auxiliary pole on the air-bearing surface is provided and d3, a positional difference between edges of said auxiliary pole and said magnetic layer on the air-bearing surface in the cross-track direction is smaller than the film thickness of said auxiliary pole or said magnetic layer, whichever is larger in cross-track width.

6. The magnetic head as claimed in claim 1, wherein a trailing side shield having a magnetic layer is provided on the trailing side of the main pole in the cross-track direction and a positional difference between edges of said auxiliary pole and said magnetic layer on the air-bearing surface in the cross-track direction is smaller than the film thickness of said auxiliary pole or said magnetic layer, whichever is larger in cross-track length.

7. The magnetic head as claimed in claim 1, wherein |l−m|≦t5 and |m−n|≦ t6 are satisfied, where l, m and n respectively denote the lengths of said auxiliary pole, said upper reader shield and said lower reader shield in the element height direction, and t5 denotes the film thickness of said auxiliary pole or said upper reader shield, whichever is longer in the element height direction and t6 denotes the film thickness of said upper reader shield or said lower reader shield, whichever is longer in the element height direction.

8. The magnetic head as claimed in claim 1, wherein |l−m|≦t5 and |m−n|≦t6 are satisfied, where l, m and n respectively denote the lengths of said auxiliary pole, said upper reader shield and said lower reader shield in the element height direction, and t5 denotes the film thickness of said auxiliary pole or said upper reader shield, whichever is longer in the element height direction and t6 denotes the film thickness of said upper reader shield or said lower reader shield, whichever is longer in the element height direction.

9. A magnetic disk storage comprising:
   a magnetic recording medium having a magnetic recording layer and a soft under layer;
   a medium drive which drives said magnetic recording medium;
   a magnetic head which writes to, and reads from, said magnetic recording medium; and
   a magnetic head drive which drives said magnetic head with respect to said magnetic reading medium:
   wherein said magnetic head comprising:
   a write head having a main pole and an auxiliary pole; and
   a read head having a lower reader shield, an upper reader shield, and a read element located between said lower reader shield and said upper reader shield;
   wherein b>a and b≧c are satisfied where, on an air-bearing surface, a denotes a cross-track width of said auxiliary pole, b denotes a cross-track width of said upper reader shield, and c denotes a cross-track width of said lower reader shield, wherein $d1 \leq t1$ and $d2 \leq t2$ are satisfied where d1 denotes a positional difference between edges of said auxiliary pole and upper reader shield on the air-bearing surface in the cross-track direction, d2 denotes a positional difference between edges of said upper reader shield and lower reader shield on the air-bearing surface in the cross-track direction, t1 denotes the film thickness of said auxiliary pole or upper reader shield, whichever of magnetic layers constituting said auxiliary pole and said upper reader is larger in cross-track width, and t2 denotes the film thickness of said upper reader shield or lower reader shield, whichever is larger in cross-track width.

10. A magnetic disk storage comprising:

a magnetic recording medium having a magnetic recording layer and a soft under layer;

a medium drive which drives said magnetic recording medium;

a magnetic head which writes to, and reads from, said magnetic recording medium; and a magnetic head drive which drives said magnetic head with respect to said magnetic reading medium;

wherein said magnetic head comprising:

a write head having a main pole and an auxiliary pole; and a read head having a lower reader shield, an upper reader shield, and a read element located between said lower reader shield and said upper reader shield;

wherein $b > a$ and $b \geq c$ are satisfied where, on an air-bearing surface, a denotes a cross-track width of said auxiliary pole, b denotes a cross-track width of said upper reader shield, and c denotes a cross-track width of said lower reader shield, wherein $d1 \leq t1$ and $d2 \leq t2$ are satisfied where d1 denotes a positional difference between edges of said auxiliary pole and upper reader shield on the air-bearing surface in the cross-track direction, d2 denotes a positional difference between edges of said upper reader shield and lower reader shield on the air-bearing surface in the cross-track direction, t1 denotes the film thickness of said auxiliary pole or upper reader shield, whichever of magnetic layers constituting said auxiliary pole and said upper reader is larger in cross-track width, and t2 denotes the film thickness of said upper reader shield or lower reader shield, whichever is larger in cross-track width.

11. A method of manufacturing a magnetic head, said method comprising:

providing a magnetic head comprising:

a write head having a main pole and an auxiliary pole; and a read head having a lower reader shield, an upper reader shield, and a read element located between said lower reader shield and said upper reader shield;

wherein $b > a$ and $b \geq c$ are satisfied where, on an air-bearing surface, a denotes a cross-track width of said auxiliary pole, b denotes a cross-track width of said upper reader shield, and c denotes a cross-track width of said lower reader shield, wherein $d1 \leq t1$ and $d2 \leq t2$ are satisfied where d1 denotes a positional difference between edges of said auxiliary pole and upper reader shield on the air-bearing surface in the cross-track direction, d2 denotes a positional difference between edges of said upper reader shield and lower reader shield on the air-bearing surface in the cross-track direction, t1 denotes the film thickness of said auxiliary pole or upper reader shield, whichever of magnetic layers constituting said auxiliary pole and said upper reader is larger in cross-track width, and t2 denotes the film thickness of said upper reader shield or lower reader shield, whichever is larger in cross-track width, making a magnetic layer for said upper reader shield;

making an inorganic insulating layer above and on the sides of said magnetic layer; and planarizing said magnetic layer and said inorganic insulating layer.

12. The magnetic head manufacturing method as claimed in claim 11, wherein said planarizing is carried out by chemical mechanical polishing.

13. A method of manufacturing a magnetic head, said method comprising:

providing a magnetic head comprising:

a write head having a main pole and an auxiliary pole; and a read head having a lower reader shield, an upper reader shield, and a read element located between said lower reader shield and said upper reader shield;

wherein $b > a$ and $b \geq c$ are satisfied where, on an air-bearing surface, a denotes a cross-track width of said auxiliary pole, b denotes a cross-track width of said upper reader shield, and c denotes a cross-track width of said lower reader shield, wherein $d1 \leq t1$ and $d2 \leq t2$ are satisfied where d1 denotes a positional difference between edges of said auxiliary pole and upper reader shield on the air-bearing surface in the cross-track direction, d2 denotes a positional difference between edges of said upper reader shield and lower reader shield on the air-bearing surface in the cross-track direction, t1 denotes the film thickness of said auxiliary pole or upper reader shield, whichever of magnetic layers constituting said auxiliary pole and said upper reader is larger in cross-track width, and t2 denotes the film thickness of said upper reader shield or lower reader shield, whichever is larger in cross-track width, making a gap layer on the lower reader shield with the read element between them;

making a resist frame for plating;

plating a magnetic layer for the upper reader shield;

plating a non-magnetic layer;

plating a magnetic layer for the auxiliary pole; and removing the resist frame.

* * * * *

UNITED STATES PATENT AND TRADEMARK OFFICE
CERTIFICATE OF CORRECTION

PATENT NO. : 7,542,244 B2 Page 1 of 1
APPLICATION NO. : 11/252866
DATED : June 2, 2009
INVENTOR(S) : Fukui et al.

It is certified that error appears in the above-identified patent and that said Letters Patent is hereby corrected as shown below:

Title Page, in the Abstract:

(57) abstract, line 4, please delete "$d1<t1$ and $d2<t2$" and
insert -- $\mathbf{d1 \leq t1}$ and $\mathbf{d2 \leq t2}$ --

In the Detailed Description:

Column 8, line 1, please delete "$|m-n1 \leq tm$" and insert -- $\mathbf{|m-n| \leq tm}$ --

Signed and Sealed this

Fourteenth Day of July, 2009

JOHN DOLL
*Acting Director of the United States Patent and Trademark Office*